G. O. DEGENER.
COMBINED TYPE WRITING AND COMPUTING MACHINE.
APPLICATION FILED JULY 26, 1911.
1,259,838.
Patented Mar. 19, 1918.
3 SHEETS—SHEET 1.
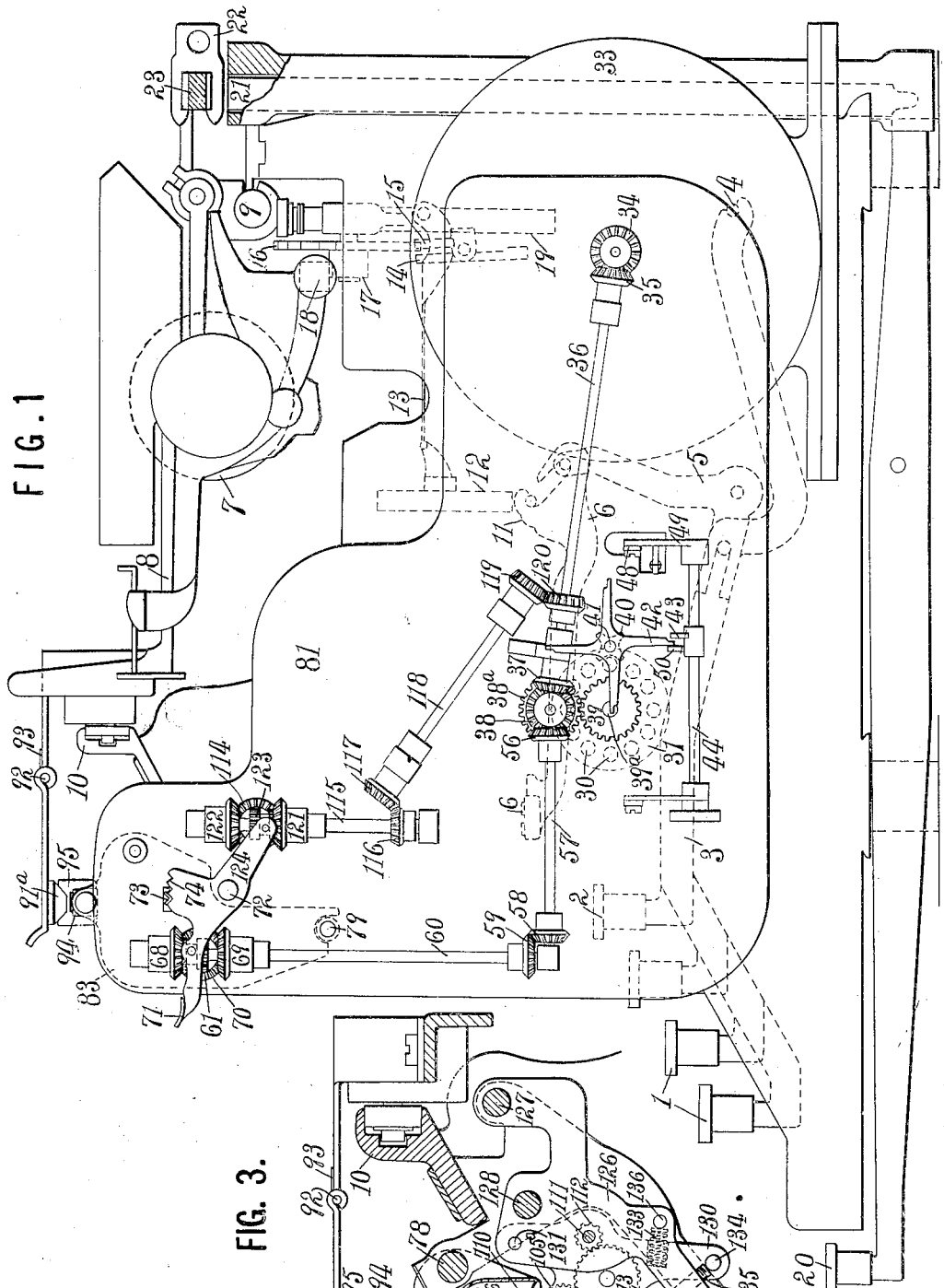
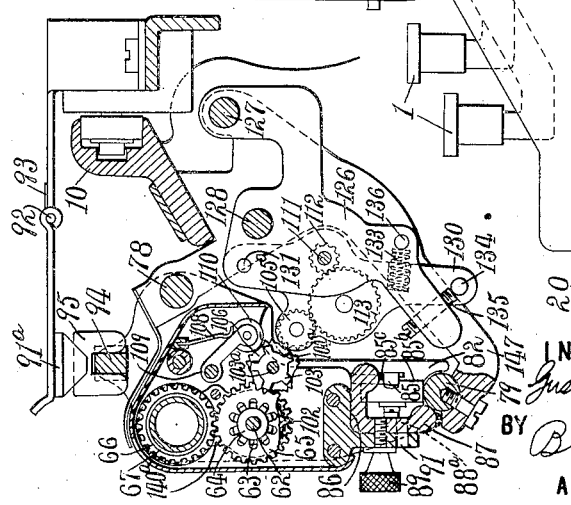

G. O. DEGENER.
COMBINED TYPE WRITING AND COMPUTING MACHINE.
APPLICATION FILED JULY 26, 1911.
1,259,838.
Patented Mar. 19, 1918.
3 SHEETS—SHEET 2.
FIG. 2.
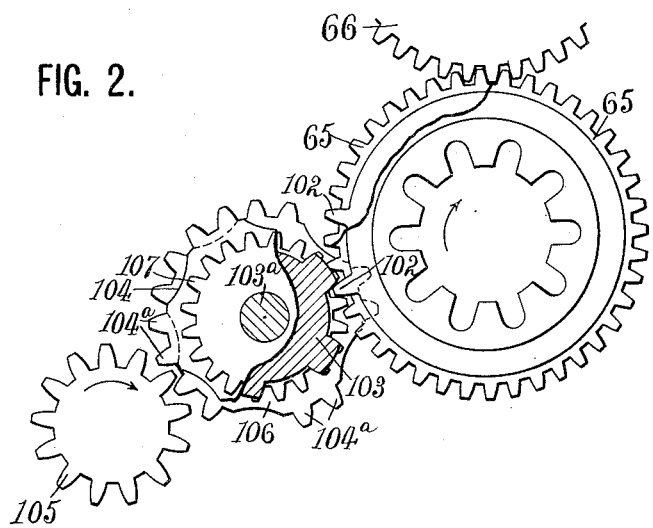
FIG. 2.<sup>A</sup>
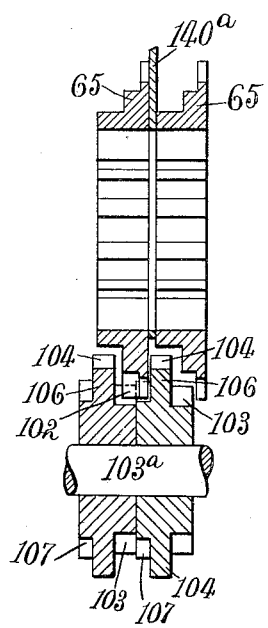
WITNESSES:
J. A. Brophy
F. D. Sweet
INVENTOR:
Gustave O. Degener
BY
B. C. Stickney
ATTORNEY

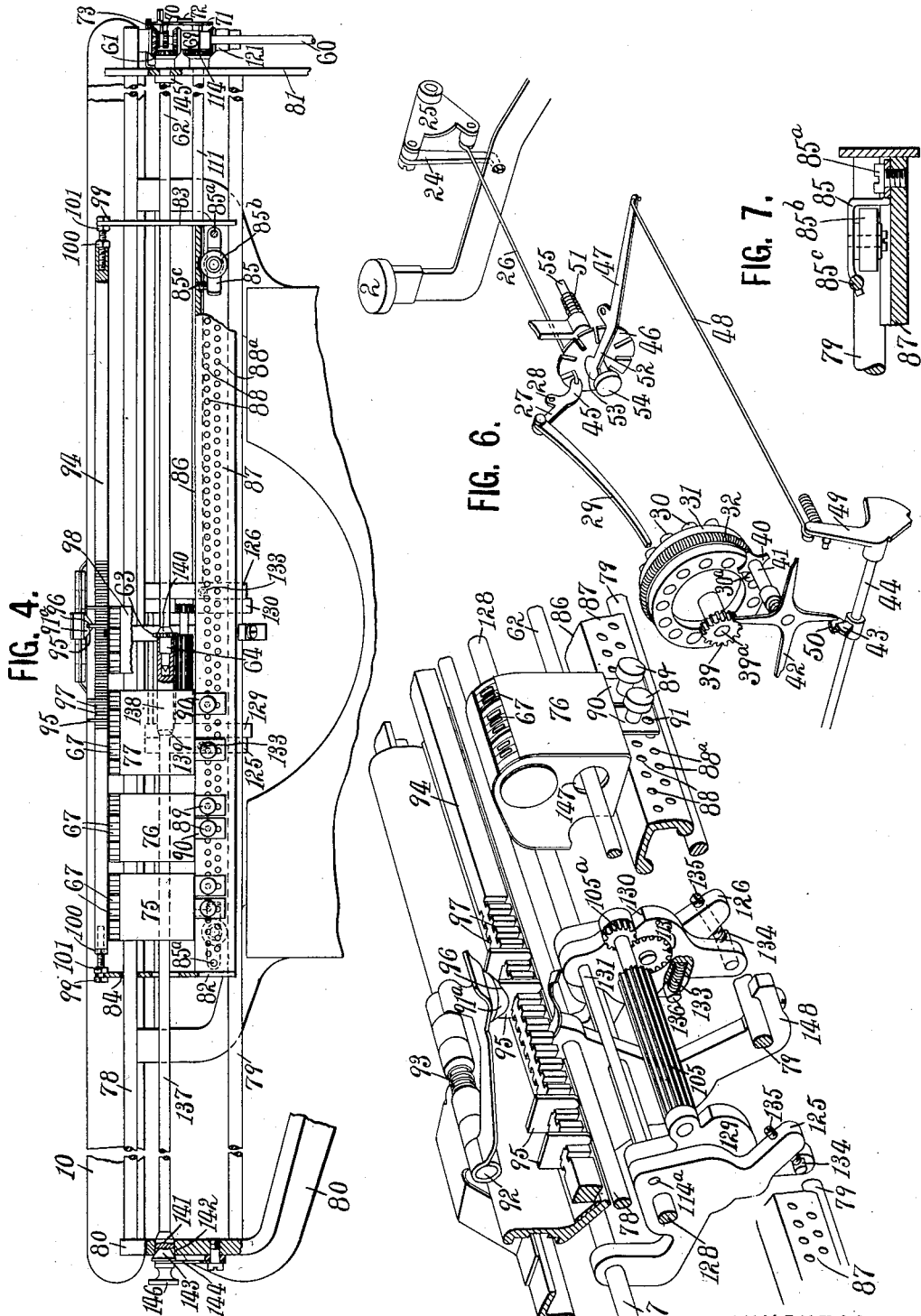

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,259,838.　　　　　Specification of Letters Patent.　　Patented Mar. 19, 1918.

Application filed July 26, 1911. Serial No. 640,614.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to printing and computing machines, whereby numbers may be printed on a work-sheet and separately carried into the computing mechanism, and more particularly to those machines in which a denominational-selecting device is employed.

One important feature of the invention relates to totalization in connection with columnar printing. It is desirable in machines of this character to be able to print a series of columns anywhere on the worksheet with a spacing between the columns uniform, with provisions whereby the spacing of each column may be varied at will, and to have the numbers as printed in the columns carried into the computing mechanism.

This desirable result is achieved, as one of the features of this invention, by providing a relative adjustment between parts of the computing mechanism individually; and also an adjustment between those parts, considered as a unit, and the work-sheet.

This feature of the invention may be embodied in different forms, but the principle involved is that of producing an adjustment relative to the work-sheet of the parts of a computing means, and also an adjustment of such parts relative to each other. While I have shown this broad principle of the invention embodied in a machine wherein denominational selection is brought about by a set of totalizers movable relatively to a master wheel, it is, of course, obvious that the same principle would be involved in a machine having other totalizer and master-wheel arrangements, and having another sort of denominational-selecting mechanism, so long as the parts of said selecting mechanism were capable of individual adjustment, with provision for their adjustment as a unit.

Another feature of the invention relates to the pinion which assists the tens-carrying trains. This pinion is shown as constructed to positively mesh with and drive the tens-carrying pinions, the construction being such that the proper engagement of the several tens-carrying pinions is made with said assisting pinion whenever tens are carried along two or more wheels concomitantly.

Another feature of my invention relates to the mounting of the master wheel. In the machine, as disclosed, the master wheel is preferably mounted on a long shaft, which may extend through all the computing heads; said shaft being mounted at one end of the framework. The end of said shaft is supported by an arbor which fits in the computing wheel bores, and which at one end is detachably mounted upon the framework, so that by withdrawing the arbor, the computing heads are released and may be detached from the machine.

Other features and advantages will hereinafter appear.

In the accompanying drawings,

Figure 1 is a side elevation of an Underwood combined typewriting and computing machine, with the present improvements applied thereto.

Fig. 2 is a diagram to illustrate the relation of the constantly rotating universal assisting pinion to the tens-carrying pinions, when tens are being carried along a series of computing wheels, showing how the successive tens-carrying wheels mesh properly with the universal assisting pinion.

Fig. 2ª is a sectional view taken at right angles to the view illustrated in Fig. 2.

Fig. 3 is a sectional side elevation of the computing trains, carriages, etc.

Fig. 4 is a front elevation of the improvement.

Fig. 5 is a perspective view of certain features of the invention.

Fig. 6 is a perspective view, illustrating the manner in which the key controls the rotation of the escapement wheel.

Fig. 7 is a fragmentary horizontal sectional view, showing a detail of the truck for supporting the sub-carriage.

Considering the separate parts more specifically as adapted to an Underwood machine, alphabet keys 1 and numeral keys 2 are mounted upon levers 3 which are pivoted at 4 and are connected by bell cranks 5 to type bars 6, so as to swing the latter upwardly and rearwardly against the front side of a platen 7, which is mounted upon a carriage 8, the latter running on a rear rail 9 and a front rail 10.

The type bars have heels 11 to strike a segmental universal bar 12 and force the same backwardly, together with the frame 13 on which said bar 12 is fixed, said frame being adapted to operate feeding dogs 14, 15, which coöperate with an escapement wheel 16, the latter being connected to a pinion 17, which is in mesh with a rack 18 upon said typewriter carriage 8; whereby the carriage is caused to feed or move step by step when the keys are operated; the carriage being driven by a spring barrel 19. Tabulating keys 20 are also provided, and are connected to denomination stops 21, to coöperate with column stops 22 adjustable along a rack 23, fixed to the carriage 8.

Each numeral key 2 also pulls down a link 24 (see Fig. 6) to vibrate a bell crank 25, the latter being connected by a horizontal link 26 to a lever 27, which is pivoted to the framework and carries on its free end a jack 29, to set any of a series of escapement pins 30 mounted on an escapement wheel 31, and held in place by a band spring 32, as set forth in application No. 543,603, filed February 12, 1910. The escapement wheel 31 may be ready to rotate at the proper time either through a constant rotative traction thereon by a motor 33 or through an intermittent rotative traction thereon through intermittent rotation of said motor controlled concomitantly with the actuation of certain of the keys. The motor 33 may be connected by a friction clutch (not shown) to a pinion 34, which meshes with a pinion 35 on a shaft 36, the latter having at its other end a pinion 37 to mesh with a pinion 38, to which is drivingly connected a pinion 38ª meshing with a pinion 39 fixed upon a shaft 39ª carrying the pin-carrying escapement wheel 31.

Normally the pins 30 project from one side of said wheel 31, but they may be caused to project individually from the other side, as at 30ª by means of the jacks 29, of which there are usually nine, whereby they are brought into a position ready to engage a four-toothed pinion 40 upon a shaft 41, which also carries a four-toothed escapement wheel 42, normally held by a dog 43, the latter fixed upon a rock shaft 44.

Each of the levers 27 has an arm 45 to operate a universal disk or member 46, which is provided with a head 54 spaced apart therefrom to permit the insertion therebetween of a head 53 on a lever 47, whereby the universal member 46 vibrates the lever 47, and by means of a thrust link 48, swings an arm 49 on said rock shaft 44, thereby rocking the dog 43, so that the secondary escapement wheel 42 escapes from said dog, and is intercepted by a companion dog 50 also on the shaft 44.

Upon relieving the key 2 from pressure, the type bar returns to normal position, the paper carriage 8 feeds and the universal member 46 is returned to normal position by a spring 51, and the rock shaft 44 returns to normal position, so that the escapement wheel 42 escapes from the dog 50, and the wheel 31 is therefore permitted to rotate until the most recently projected pin thereon is intercepted by the pinion 40, whereupon a succeeding tooth of the escapement wheel 42 is arrested by the dog 43.

This movement of the pin-carrying escapement wheel 31, and of the pinions 38 and 38ª, is communicated by a pinion 56 meshing with 38, to a shaft 57, which carries also a pinion 58 meshing with a pinion 59 upon a vertical drive shaft 60. This shaft operates in either forward or backward direction a pinion 61, upon a shaft 62, which carries a master wheel 63, the latter consisting of a series of radial spokes or teeth projecting from a hub 64, and engaging internal teeth formed upon a computing wheel 65, which meshes with a gear 66 provided upon a dial wheel 67, the dial wheels being arranged side by side as seen at Figs. 4 and 5, there being one computing wheel 65 for each dial wheel.

The connection between the master wheel shaft 62 and the vertical drive shaft 60, comprises opposite pinions 68, 69 loose upon said shaft, and having internal clutch members, with either of which may engage a common clutch member 70 splined upon the shaft 60, and controlled by a lever 71 pivoted at 72, and held by a spring detent 73 which engages notches 74 formed on the lever, the detent being beveled in both directions so as to permit it to ride on the projections between the notches in either direction.

As seen at Fig. 4, the computing mechanism may comprise several adding heads 75, 76, 77, each adding head containing a plenum of dial wheels 67, with their trains of computing and tens-carrying wheels. These computing heads may be all removably and adjustably fixed upon a sub-carriage, which slides upon upper and lower rails 78, 79, fixed in end brackets 80, 81 forming parts of the framework of the machine; said sub-carriage including opposite end plates 82, 83 perforated at 84, to fit the upper rail 78, and having at their lower ends trucks 85, to run upon the rail 79. Each truck is pivoted at one of its ends to the sub-carriage 85ª, and at the other end carries a roll 85ᵇ. By means of screws 85ᶜ, Fig. 4, the trucks can be independently raised and lowered, to insure proper relationship between the co-acting parts of the computing mechanism.

This sub-carriage also includes a main horizontal connecting bar, in the form of a horizontal plate or table 86, upon which the adding heads rest, and a vertical flange or plate 87 which may be integral with 86, and having threaded holes or perforations 88 to receive thumb screws 89, whereby adding heads are secured to said sub-carriage; each adding head having one or more pendent ears or lugs 90, through which said screws 89 pass.

The threaded holes or perforations are for the purpose of permitting adjustments of each adding head at intervals agreeing with the character-feeding intervals of the typewriter carriage 8, and since these character-feeding intervals are small, the threaded holes 88 are arranged in two rows, one above the other, in echelon (i. e. out of vertical and horizontal alinement) and each lug 90 has upper and lower holes 91 to permit the screws 89 to be placed in either the upper row 88 or lower row 88ᵃ of threaded holes in the bar 87. The provision of two ears 90, and two screws 89, that is to say the provision of a plurality of points of attachment for each computing head, enables the same to be rigidly secured upon the sub-carriage in the exact position desired, or so that the computing wheels will register properly with the master wheel 63, after the character-feeding movements of the carriage 8.

For the purpose of connecting the sub-carriage to the main carriage of the typewriter, there may be provided a latch 91ᵃ pivoted at 92 on the main carriage 8 normally pressed downwardly at its forward end by a spring 93, whereby it may be locked in engagement with any one of a plurality of catches 95 adjustably mounted on a bar 94, the latch being provided with a slot 96 for this purpose.

It will be noted that the bar 94 is provided with slots 97 forming a rack into which the forks of the catches 95 can engage whereby these catches can be adjusted to different positions along the bar 94, and thus vary the points at which the latch 93 can be connected to the sub-carriage whereby relative positioning of the sub-carriage to the main carriage can be selectively varied.

The latch 91ᵃ is preferably beveled upon opposite sides of the slots, so that after setting one of the catches, it is only necessary to slide the sub-carriage along, until the catch thereon lifts the latch, whereupon the latter will snap into engagement with the catch.

It will be seen that by means of the screws 89 and the holes 88, 88ᵃ, the adding or computing heads may be secured to the sub-carriage at different character space intervals therealong; the adjustments being independent to permit the computing heads to be adjusted relatively to each other as well as relatively to the sub-carriage. In view of the fact that the entire sub-carriage may be secured by the catch 95, and the latch 91 to the main carriage at different character space intervals along the latter, the entire group of computing heads may be adjusted bodily with reference to the typewriter carriage 8. As stated above there may be provided a plurality of catches 95, and the latch 91ᵃ may be connected with any one of them, so that at any time the relationship between the computing heads and the main carriage 8 may be adjusted to a predetermined extent. This is an advantage not only when all of the computing heads are to be brought into use at each line of writing, but also when it is desired to write several lines using only one computing head. Again, three columns may be written upon the work sheet and added by the first three adding heads 75, 76, 77, seen at Fig. 4, while the latch is in engagement with the left hand catch 95, and then said latch may be transferred to another catch at the right of the catch just mentioned, as seen at Fig. 4, to write in another column and add the amount so written upon a fourth adding head 98. Thereupon the latch may be restored to the original catch 95 and numbers written and added in the first three columns as before. This is merely one example of a variety of uses to which the improvements can be put.

It is desirable that the computing wheels in the computing heads should also stand in proper relation to the master wheel 63, and further that the sub-carriage should be accurately adjusted relatively to the main or typewriter carriage. In order to attain this fine adjustment the bar 94 may be adjustably secured at its ends by means of a pair of screws 99, which pass through the end plates 82 and 83 and are threaded into the end of the bar.

It will be seen that if these screws are manipulated the position of the bar or rack 94 can be adjusted to a nicety, and thus the position of the computing heads and sub-carriage, relative to the main or typewriter carriage, can be accurately determined. After such adjustment, the screws may be locked in their adjusted positions by nuts 100 and 101.

The tens-carrying mechanism comprises a special tooth 102 on each computing wheel 65, which once in each revolution, engages one of the teeth of the five-toothed pinion 103 loose upon an arbor 103ᵃ, and thereby turns the said pinion, or at least starts it in revolution. This causes engagement of teeth 104ᵃ Fig. 3 on a pinion 106 with a constantly rotating universal assisting pinion 105, Fig. 5, the latter driven by the motor 33 in a manner presently to be described. The teeth 104ᵃ are made sharp, so that they will engage readily with the teeth of the universal pinion 105, which it will be seen at Fig. 5, is elongated or in the form of a barrel, so as to be capable of actuating all of the pinions 106 in any computing head 76.

Heretofore, the universal pinion 105 has been made with minute teeth which may fail to perform their function when the sub-carriage and its parts are of great length, and hence springy, by reason of their light construction.

To overcome this difficulty, the teeth of the universal pinion 105 are made of coarse pitch, and the teeth 104$^a$ of corresponding coarseness, so that 105 may be effective to rotate 106.

The pinion 106, on which the teeth 104$^a$ are located, is secured to said pinion 103 so as to move therewith. Secured on the opposite side of the pinion 103 from that at which the pinion 106 is located, is an ordinary pinion 107, Fig. 2$^a$, which meshes with the computing wheel 65 of next higher denomination, 107 being one-half the diameter of 65. The three members 103, 106 and 107 are therefore rigid together, and turn one-fifth of a revolution concomitantly with the rotation of the computing wheels through one-tenth of a revolution.

As it will be seen at Fig. 2, pinion 106 is being rotated by pinion 105. When the computing wheel 65 of next higher denomination is being turned, the tooth 102 on said higher wheel 65 is so placed or timed that it operates its pinion 103 accordingly or at the proper instant, so that when two tens-carrying operations are carried on concomitantly, the teeth 104$^a$ on the tens-carrying wheel of higher denomination mesh precisely with the teeth of 105. Hence tens-carrying may proceed along the series of wheels without danger of collision or abutting of any tooth 104$^a$ on any pinion with the teeth of the pinion 105.

The initial movement of the pinion 106 is effected by the movement of the tooth 102. This brings the teeth 104$^a$ on the pinion 106 into engagement with the universal pinion 105, whereby the latter rotates the former until the teeth 104$^a$ escape from the universal pinion 105 when further movement will be arrested by a spring 108 bearing on an arm 109, to force a roller 110 on the free end thereof into engagement with one of a plurality of notches 104 on the wheel 106 located between the pairs of teeth 104$^a$. After the escape of the teeth 104$^a$ on the pinion 106 from the teeth of the universal pinion 105, the latter rotates idly.

Said universal pinion 105 is rotated by a shaft 111 having thereon a pinion 112 meshing with an idler 113, which also meshes with a pinion 105$^a$, which is fixedly connected to pinion 105 and may be considered a part thereof. The shaft 111 has on its end a pinion 114, driven by a vertical shaft 115, having at its lower end a pinion 116, meshing with a pinion 117 on an inclined shaft 118, the lower end of which has a pinion 119 meshing with a pinion 120 upon said motor driven shaft 36.

On said drive shaft 115, are loose pinions 121, 122, meshing with 114, and having internal clutch members to engage a common clutch member 123, which is controlled by an arm 124 of the lever 71, so that when said lever is operated, the computing mechanism may be set for addition or subtraction, or silenced.

The assisting pinion or barrel 105 is supported by a swinging frame upon a pair of fixed brackets 125, 126, and said brackets are fast on the rods 127, 128, which are fixed upon the machine frame and form guides for the margin gages of said Underwood typewriter. Said swinging frame comprises ends 129, 130 connected by an endwise shaft 131 which is journaled at its ends at 114$^a$ in said brackets 125, 126. The shaft 131 may be readily removed so that the ends 129, 130 may be demounted when required for inspection, cleaning and repair of the pinion and other parts. Moreover, the hinging of the supports for said assisting pinion 105 permits the latter to be finely adjusted relatively to the mutilated pinions 106. This may be attained by a spring or springs 133 which tend to lift the ends 129, 130, turning them about the shaft 131, so that projections 134 upon said members 129, 130 are lifted to certain stopping points determined by contact with adjusting screws 135 provided in the lower ends of the brackets 125, 126. By adjusting either screw up and down, the assisting pinion or barrel 105 may be tilted at one end or the other so as to be brought into parallelism with the path of the character-feeding movement of the mutilated pinions 106; and both screws 135 may be turned as required to lift or drop the pinion 105 bodily. A stop 136 is provided for each of the supporting members 129, 130 to prevent undue downward movement thereof.

The computing heads 75, 76, 77 and 98 (and others if desired) are mounted not only adjustably but demountably; and for the purpose of permitting detachment and attachment of these computing heads, the master wheel shaft 62 is made to terminate in the vicinity of the master wheel, and the arbor 137 is detachably mounted in the machine to afford a support for the inner end of said master wheel shaft 62. The hub 64 of the master wheel fits in a bore formed in the inner end of the arbor 137; said inner end of said arbor being enlarged at 138 to fit the bores of the computing wheels 65. The left hand end of this enlarged portion is beveled at 139, and a similar bevel 140 is formed on the opposite side of the master wheel, so that both the master wheel and the enlargement 138 are guided in to the bores of the computing wheels 65. The part 138 serves as a sleeve or bushing to support the master wheel within the bores of the computing wheels, that is, to cause the computing wheels to support the master wheel; the computing wheels themselves being suitably supported, as by means of devices 140ª. At its left hand end the arbor 137 has a head 141 to fit in a socket 142 formed in the bracket 80. A keeper or latch 143 is mounted on the end of a spring finger 144 to abut against the end of said arbor 137 and presses the latter against the master wheel 63; the master wheel shaft having an axle 145 to abut against the bracket 81. Upon pulling out a button 146, the keeper 143 is withdrawn, and the arbor 137 may be thrust to the left through the opening 142 and removed from the machine; said arbor passing through some or all of the computing wheels as it is detached from the machine. By loosening the screws 89, any computing head may now be demounted from the machine. To re-assemble the parts, it is only necessary to thrust the arbor 137 through the opening 142 and through any computing head that may be in place, and passing it over the hub 64 of the computing wheel 63, and then by means of the button 146 snap the keeper 143 into place, and then the machine will be ready for operation. Owing to the looseness of the joint between the long arbor 137 and the long shaft 62, the master wheel 63 may play freely forward and backward or up and down; but the enlargement or sleeve 138 on the arbor always brings the master wheel to the proper relation with the series of computing wheels 65 in any adding head. It is to be understood that there is formed in the sides of each adding head a circular opening 147, through which the shaft 62 and the arbor 137 may pass. This opening 147 is large enough to permit play of 62 and 137 while restricting said play within certain limits.

It will be noted that by means of the adjusting devices shown, including springs 133 and screws 135 that the relation between the assisting pinion 105 and the mutilated pinion 106 may be accurately adjusted from all positions in the travel of the sub-carriage 82, 83, 86; while the various computing heads may be readily adjusted along said sub-carriage, and may also be readily demounted from said sub-carriage when required, without interfering with said pinion adjustment.

The lower rail 79, upon which the sub-carriage runs, is supported at its middle upon a bracket 148, which is in the form of a hanger depending from the fixed rods 127 and 128 already mentioned, and is located about midway of the length of said lower rail, so that the sub-carriage may have freedom of movement for substantially the entire length of travel of the main carriage of the typewriter. This bracket 148 occupies a position about in line with the master wheel 63 and between the two brackets 125 and 126 which carry the swinging frame of the assisting pinion 105.

Variations may be resorted to within the scope of the invention, and portions of the improvements may be used without others.

Having thus described my invention, I claim:

1. In a combined typewriting and computing machine, the combination of the usual typewriter carriage and sub-carriage connected thereto, a series of computing heads upon the sub-carriage, the sub-carriage having perforations, and securing means to secure the computing heads to said sub-carriage by entering the perforations, each computing head having ears or lugs to be engaged by said securing means, the perforations in the sub-carriage being arranged in echelon, and said ears or lugs having correspondingly placed holes to enable the securing means to be placed in either row of said perforations.

2. In a combined typewriting and computing machine, the combination of a typewriter carriage, a sub-carriage connected thereto, a series of computing heads upon said sub-carriage, said sub-carriage comprising end pieces and a plate connecting said end pieces, said plate forming a table or support for the computing heads and a plate or flange at an angle to the table and having means to secure said computing heads to said sub-carriage.

3. In a combined typewriting and computing machine, the combination of a typewriter carriage, a sub-carriage connected thereto, rails or tracks for each of said carriages, a series of computing heads upon said sub-carriage, and typewriter key connections from the typewriter keys to the computing heads; said sub-carriage comprising end pieces and a plate connecting said end pieces, said plate forming a table or support for the computing heads, said end plates having perforations to ride upon one of said rails and trucks to ride upon another of said rails.

4. In a combined typewriting and computing machine, the combination of a typewriter carriage, a sub-carriage connected thereto, rails or tracks for each of said carriages, a series of computing heads upon said sub-carriage, and typewriter key connections from the typewriter keys to the computing heads, said sub-carriage comprising end pieces and a plate connecting said end pieces, said plate forming a table or support for the computing heads, said end plates having perforations to ride upon one of said rails and trucks to ride upon another of said rails, said trucks being independently adjustable, to vary the level of said sub-carriage.

5. In a combined typewriting and computing machine, the combination with a typewriter carriage, of a sub-carriage, computing devices separately settable on said sub-carriage, means on one of the carriages, and a plurality of devices settable on the other of said carriages, said means and said plurality of settable devices coöperating with each other so that relative adjustment of the two carriages can be secured to any of a plurality of predetermined relative letter-space positions.

6. The combination with a typewriter carriage, and a sub-carriage, of a latch on one of said elements, a plurality of adjustable catches on the other of said elements, to afford relative adjustment of the sub-carriage and the typewriter carriage to any of a plurality of predetermined letter-space positions, said latch having a spring, and oppositely beveled faces whereby a movement of the sub-carriage in either direction after releasing said latch, will move the latter and permit it to positively engage a different catch.

7. A machine capable of columnar computation and having computing means, including a plurality of denominational-selecting mechanisms, and printing devices for printing on a work-sheet numbers which are carried into the computing means, and comprising, in combination, means enabling an adjustment between the denominational-selecting mechanisms individually, and between a plurality of said mechanisms considered as a unit and the work-sheet, both adjustments being one or more letter-space intervals.

8. The combination of a plurality of computing devices, and printing means for printing on a work-sheet numbers which are carried into the computing devices, said computing devices being adjustable relatively to each other, and adjustable concomitantly relatively to the work sheet, both adjustments being one or more letter-space intervals.

9. The combination of computing means, including denominational-selecting mechanism, and actuating means therefor for controlling the computing means, parts of the denominational-selecting mechanism being adjustable individually, and also adjustable as a unit relatively to the work-sheet, both adjustments being one or more letter-space intervals.

10. The combination with a series of computing wheels, of tens-carrying trains therefor, and an assisting pinion universal to said trains; each train comprising a pinion meshing with the computing wheel of next higher denomination, and also comprising a member to be engaged by a part on its associated computing wheel, and further comprising a mutilated pinion for engagement with said assisting pinion; said mutilated pinion and said assisting pinion having comparatively coarse and powerful teeth; said assisting pinion and said trains being so proportioned that when tens are carried upon several computing wheels concomitantly, the teeth of the successive mutilated pinions mesh properly with said assisting pinion.

11. In combination, a carriage and a set of computing wheels thereon, trains of tens carrying devices for said wheels, including a set of pinions, an assisting pinion universal to said pinions, supporting means for said assisting pinion, and means for affording the adjustment of said universal pinion at the ends thereof, to bring the same into parallelism with the direction of letter feeding movement of the computing head.

12. In combination, a carriage and a set of computing wheels thereon, trains of tens carrying devices for said wheels, including a set of pinions, an assisting pinion universal to said pinions, a pair of brackets fixed upon the typewriter frame, and a pair of rocking members mounted upon said brackets and carrying said assisting barrel pinion, and means for adjusting either of the pinion supports independently of the other.

13. In combination, a carriage and a set of computing wheels thereon, trains of tens carrying devices for said wheels, including a set of pinions, an assisting pinion universal to said pinions, supporting means for said assisting pinion, and means for adjusting said supporting means and the pinion together.

14. In combination, a carriage and a set of computing wheels thereon, trains of tens carrying devices for said wheels, including a set of pinions, an assisting pinion universal to said pinions, supporting means for said assisting pinion, a spring or springs for moving said supporting means and pinion in one direction, and adjustable screws for limiting such movement.

15. The combination with a traveling computing head, including a series of internally geared computing wheels, of a shaft supported at one end, a master wheel on the other end of said shaft to engage said computation wheels, and an arbor supported at one end upon the machine frame and at the other end having a portion fitting in said computing wheels and supporting said master wheel, said arbor being adjustably mounted upon the machine frame.

16. The combination with a traveling computing head, including a series of internally geared computing wheels, of a shaft supported at one end, a master wheel on the other end of said shaft to engage said computation wheels, an arbor supported at one end upon the machine frame and at the other end having a portion fitting in said computing wheels and supporting said master wheel, said arbor being adjustably mounted upon the machine frame and having an enlarged head or sleeve formed with a beveled guide at one end, and a beveled guide being also provided for the master wheel so that the master wheel can be guided and supported within the computation wheels.

17. The combination with a traveling computing head, including a series of internally geared computing wheels, of a shaft supported at one end, a master wheel on the other end of said shaft to engage said computation wheels, and an arbor supported at one end upon the machine frame and at the other end having a portion fitting in said computing wheels and supporting said master wheel, said arbor being releasably held at one end upon the machine, and being detachable from the machine and from said computing wheels.

18. The combination with a traveling computing head, including a series of internally geared computing wheels, of a shaft supported at one end, a master wheel on the other end of said shaft to engage said computation wheels, and an arbor supported at one end upon the machine frame and at the other end having a portion fitting in said computing wheels and supporting said master wheel, said arbor being adjustably mounted upon the machine frame, said computing head being adjustable along the typewriter carriage.

19. The combination with a traveling computing head, including a series of internally geared computing wheels, of a shaft supported at one end, a master wheel on the other end of said shaft to engage said computation wheels, and an arbor supported at one end upon the machine frame and at the other end having a portion fitting in said computing wheels and supporting said master wheel, said arbor being adjustably mounted upon the machine frame, said computing head being adjustable along the sub-carriage and connected to the typewriter carriage.

20. The combination with a traveling computing head, including a series of internally geared computing wheels, of a shaft supported at one end, a master wheel on the other end of said shaft to engage said computation wheels, and an arbor supported at one end upon the machine frame and at the other end having a portion fitting in said computing wheels and supporting said master wheel, said arbor being adjustably mounted upon the machine frame, said sub-carriage being adjustably connected to the typewriter carriage.

21. The combination with a traveling computing head, including a series of internally geared computing wheels, of a shaft supported at one end, a master wheel on the other end of said shaft to engage said computation wheels, an arbor supported at one end upon the machine frame and at the other end having a portion fitting in said computing wheels and supporting said master wheel, said arbor being adjustably mounted upon the machine frame, and means for effecting up and down adjustment of each end of the sub-carriage, and independent adjustment of each end of said assisting pinion.

22. The combination with a key-controlled master wheel, of a series of computing heads each having computing wheels with internal gears, so that the master wheel may pass through the computing wheels, each computing head being adjustable along the carriage and demountable therefrom.

23. The combination with a typewriter carriage, of computing mechanism, a sub-carriage, and a series of computing heads on said sub-carriage and adjustable thereon relatively to one another at letter-space intervals, said sub-carriage being adjustably connected to said typewriter carriage to afford independent adjustment of all of the computing heads simultaneously at letter-space intervals relative to said typewriter carriage.

24. The combination with a master wheel and a series of computing wheels, of tens carrying trains including pinions, a universal pinion for assisting said pinions, said computing wheels and trains being inclosed in a computing head which is detachable from the machine, said tens carrying pinion being mounted upon the framework of the machine and independent of the movement of the computing heads.

25. The combination with a platen adapted to support a work sheet, a plurality of computing heads for computing a plurality of columns on said work sheet, means for moving said computing heads concomitantly with the movement of said platen, and means enabling the individual adjustment of said heads to change their position, relative to each other, and relative to said work sheet.

26. The combination with a typewriter carriage, of computing heads, means for effecting an adjustment, one or more letter-space distances, of said computing heads relative to said typewriter carriage, and means to also effect an adjustment, one or more letter-space distances, of said computing heads relative to each other.

27. The combination with a typewriter carriage, of a computing mechanism including a master wheel, a plurality of computing heads, each of said computing heads having an opening therethrough whereby said master wheel can pass through said computing heads during a relative movement of said computing heads and said master wheel, a shaft for the master wheel, a support for said shaft, means for enabling a relative adjustment of said computing heads with respect to each other along said shaft, and means whereby said support for said master wheel may be disconnected therefrom and removed to thereby enable any totalizer to be removed from the machine.

28. In a combined typewriting and computing machine, the combination with a letter-feeding carriage and a master-wheel, of a series of gangs of computing wheels, means controlled by said letter feed for determining the denominational relation of said master-wheel and said computing wheels successively in the several gangs, carry-over wheels for each gang, and a member adjacent the master-wheel and fixed relatively to the plane thereof to engage and turn said carry-over wheels of the gang in active position with respect to the master-wheel.

29. The combination with a computing head comprising a plurality of computing wheels, of tens-carrying mechanism for said computing wheels including a gear common to all of said computing wheels for assisting in the tens-carrying operation, a pivotal mounting for said gear, a spring for holding said gear to its work, and means on said spring for adjusting the tension thereof.

30. The combination with a computing head including a series of computing wheels, of tens-carrying mechanism for carrying between wheels of high and low denominations, said tens-carrying mechanism including a common barrel pinion, a support for said pinion, means for shifting said support to bring about the engagements and disengagements of said barrel pinion, and adjustable means for variably limiting the throw of said pinion.

31. In a combined typewriting and computing machine, the combination with a totalizer, of a rest on which it may stand by gravity, a bib on the totalizer, a member forming part of said rest and extending at right-angles to said rest with which said bib coöperates, a latch for locking said totalizer to said rest by causing said bib to lock with said right-angled member, carry-over devices forming part of said totalizer, a carry-over member relatively to which said rest is movable, and means for adjusting the position of said carry-over member.

32. In a combined typewriting and computing machine, the combination with a traveling carriage, of a frame adjustable at letter-space intervals relatively thereto, a rest on said frame and finely adjustable thereto, a totalizer adapted to stand by gravity on said rest, a member extending at right angles to said rest, a bib on said totalizer coöperating with said right-angled member, carry-over devices for said totalizer, and a member relatively to which said carriage moves for driving said carry-over devices.

GUSTAVE O. DEGENER.

Witnesses:
J. E. LUCAS,
J. E. DAVIDSON.